United States Patent [19]
Sie et al.

[11] Patent Number: 5,534,941
[45] Date of Patent: Jul. 9, 1996

[54] SYSTEM FOR DYNAMIC REAL-TIME TELEVISION CHANNEL EXPANSION

[75] Inventors: John J. Sie, Englewood; Ganesh R. Basawapatna, Greenwood Village, both of Colo.

[73] Assignee: Encore Media Corporation, Englewood, Colo.

[21] Appl. No.: 245,596

[22] Filed: May 20, 1994

[51] Int. Cl.$^6$ .................................................. H04N 7/16
[52] U.S. Cl. .............................. 348/564; 348/461; 348/6
[58] Field of Search ...................... 348/564, 384, 348/385, 568, 461, 478, 473, 484, 485, 6, 16, 580, 581, 578, 588; 370/71, 73, 76, 124, 162; H04N 5/445, 7/16, 7/167, 7/173

[56] References Cited

U.S. PATENT DOCUMENTS

| | | | |
|---|---|---|---|
| 5,008,750 | 4/1991 | Gomikawa | 348/588 |
| 5,023,720 | 6/1991 | Jardins | 358/183 |
| 5,138,460 | 8/1992 | Egawa | 358/224 |
| 5,157,491 | 10/1992 | Kassatly | 358/146 |
| 5,200,823 | 4/1993 | Yoneda et al. | 348/473 |
| 5,208,669 | 5/1993 | Richards | 358/140 |
| 5,262,860 | 11/1993 | Fitzpatrick et al. | 358/142 |
| 5,359,601 | 10/1994 | Wasilewski et al. | 370/73 |

FOREIGN PATENT DOCUMENTS

| | | | |
|---|---|---|---|
| 508654A2 | 10/1992 | European Pat. Off. | H04N 7/173 |
| 624040A2 | 9/1994 | European Pat. Off. | H04N 7/173 |
| WO93/11617 | 6/1993 | WIPO | H04H 1/00 |
| WO93/11640 | 6/1993 | WIPO | H04N 7/16 |
| WO94/10775 | 5/1994 | WIPO | H04K 1/02 |
| WO94/10802 | 5/1994 | WIPO | H04N 7/167 |

*Primary Examiner*—Safet Metjahic
*Assistant Examiner*—Nina M. West
*Attorney, Agent, or Firm*—Duft, Graziano & Forest

[57] ABSTRACT

A system is provided by which a single active video signal, along with a plurality of audio and data streams can be made to represent a number of different screens of information at a cable TV set. The system uses essentially only the bandwidth of a single video channel to provide a viewer with a plurality of screens, one or more of which include the same active video picture, simultaneously with other screens which display only audio and text/graphics. This multiple-screen capability is provided by a mapping function which creates an effective plurality of channels that are dynamically and seamlessly switched.

13 Claims, 10 Drawing Sheets

SYSTEM FOR DYNAMIC REAL-TIME TELEVISION CHANNEL EXPANSION

FIELD OF THE INVENTION

This invention relates generally to television transmission systems, and in particular to a system for switchably combining, in real time, a selectable plurality of audio and data channels with a selectable video signal and transmitting the combination over a single television channel.

PROBLEM

Conventional cable and satellite television transmission systems typically devote an entire channel bandwidth to the transmission of a video signal along with a single stereo pair audio signal and also possibly a single data stream. Although there are a number of different television channels available on a typical cable or satellite television system, there are nevertheless a limited number of these channels, largely due to limitations imposed by FCC frequency and channel allocations. While some spare channels are available on most cable or satellite systems, the rapid growth of the cable television industry is causing more of the previously unused channels to become unavailable. It is therefore a problem to provide the capability for transmitting the desired amount of program information over these diminishing number of channels.

It is also desirable to be able to select and switch, in real time, the correspondence between a given video signal and a television channel number at the receiving end. It is further desirable to have the capability to combine selected audio signals and other data (such as text or graphics) with a given transmitted video signal and to switch between various combinations thereof in real time.

Even though digital compression techniques such as the "MPEG" system for compression of digitally encoded signals can be used to increase the amount of data transmitted within a given bandwidth, there exists no present method for real time switchable interconnection of various audio and data signals with a received video "picture" on one or more selectable channels. The above problems are particularly applicable to cable television systems.

SOLUTION

The present invention overcomes the foregoing problems and achieves an advance in the art by providing a system which provides for the real time capability to combine a selectable plurality of audio and data signals with a desired "active" video signal and then to transmit the combination of signals over a single dynamically selectable television channel.

An encoder and a decoder, both of which have associated switches, are used to process the television signal at the transmitting and receiving sites, respectively. The encoder switch is controlled by a mapping function to determine the video/audio/data signal correspondence. The encoder switches the selected input audio signals and data (which is typically text or graphics) along with the selected active video signal onto a single output channel. This provides the flexibility of transmitting an active video signal on a single channel in combination with a dynamically selectable plurality of corresponding audio signals and text or graphics. The encoder also inserts a mapping function into the data stream to be transmitted. This mapping function includes a channel select command which is dynamically modifiable (i.e., in real time) to establish the correspondence between a particular video signal and the selected television channel number.

The receiving end decoder receives the transmitted television channel and performs the inverse function of the transmitting end encoder by using the received channel select command in conjunction with the mapping function to determine the correspondence between the received television channel signal and the selected video channel number, and the associated active video, audio and text/graphic signals. The received video signal can be routed to one or more channels on the receiving television set together with an associated correspondence of audio and/or data information which is determined by the mapping function.

The television receiver is thus presented with a single video picture on the selected channel with the picture being controllably combined with a preselected combination of audio signals and/or data. Alternatively, selected audio and data signals may be combined according to the mapping function and presented on one or more "screens" (conventional user-selectable "TV channels") separately from the screen which may be concurrently displaying the active video signal, or "active video picture".

The present system uses essentially only the bandwidth of a single television video channel to provide a viewer with a plurality of TV receiver screens. One or more of the screens may include the same active video picture. Simultaneously others of the screens may display only audio and text/graphics. This multiple-screen capability is provided by a mapping function which creates an effective plurality of channels that are dynamically and seamlessly switched. Therefore, a method is provided by which a single active video signal, along with a plurality of audio and data streams can be used to represent a number of different screens of information at a cable TV set.

BRIEF DESCRIPTION OF THE DRAWING

The invention may be better understood from a reading of the following description thereof taken in conjunction with the drawing in which.

DETAILED DESCRIPTION

Definitions

For the purpose of this disclosure, the following definitions are applicable to the present invention as described and claimed:

Mapping is the process by which a particular channel of a television set is assigned video, audio, and data signals.

A Video Channel is the bandwidth associated with a particular transmission path carrying a single video signal as well as audio and text signals. An NTSC cable channel is 6 MHz wide. A satellite transponder channel is typically 36 MHz wide and may contain one video signal in an analog transmission system or six or more conventional "video channels" in a digitally compressed system.

Screen: A channel can be mapped into a number of different viewable "television channels" at a receiving TV set, each of which is defined as a screen. A screen is thus a conventional user-selectable "TV channel".

An Active Video Channel (AVC) is a channel whose screen consists of an active moring picture, such as a movie, sports action or other type of moving picture. A screen associated with an AVC is called an "active screen". An AVC may be associated with one or more "active screens" on different channels at the receiving end.

An Audio and Data Channel (ADC) is a channel whose display consists of data or graphics and which also might carry voice or music. and ADC is associated with one or more passive screens, i.e., non-active screens.

A Data Screen comprises an Audio and Data Channel (ADC), wherein the data channel is typically displayed as text or graphics. A data screen does not include a video signal.

Mapping Function: A mapping function is employed by the present system which includes an n×n×n matrix than maps a composite ViAiDi (video/audio/data) vector to a composite VoAoDo vector, where Vi represents the individual video inputs, Ai and Di are the audio and data inputs (at the uplink or transmitting site) respectively, and Vo, Ao, and Do are the corresponding outputs (at the receiving television site). In a digital version of the present system, the mapping function is supplemented with a "tagging function" which is essentially a "screen identifier" which serves to identify the screen with which a given packet of data is associated.

SYSTEM OVERVIEW

Figure 1:
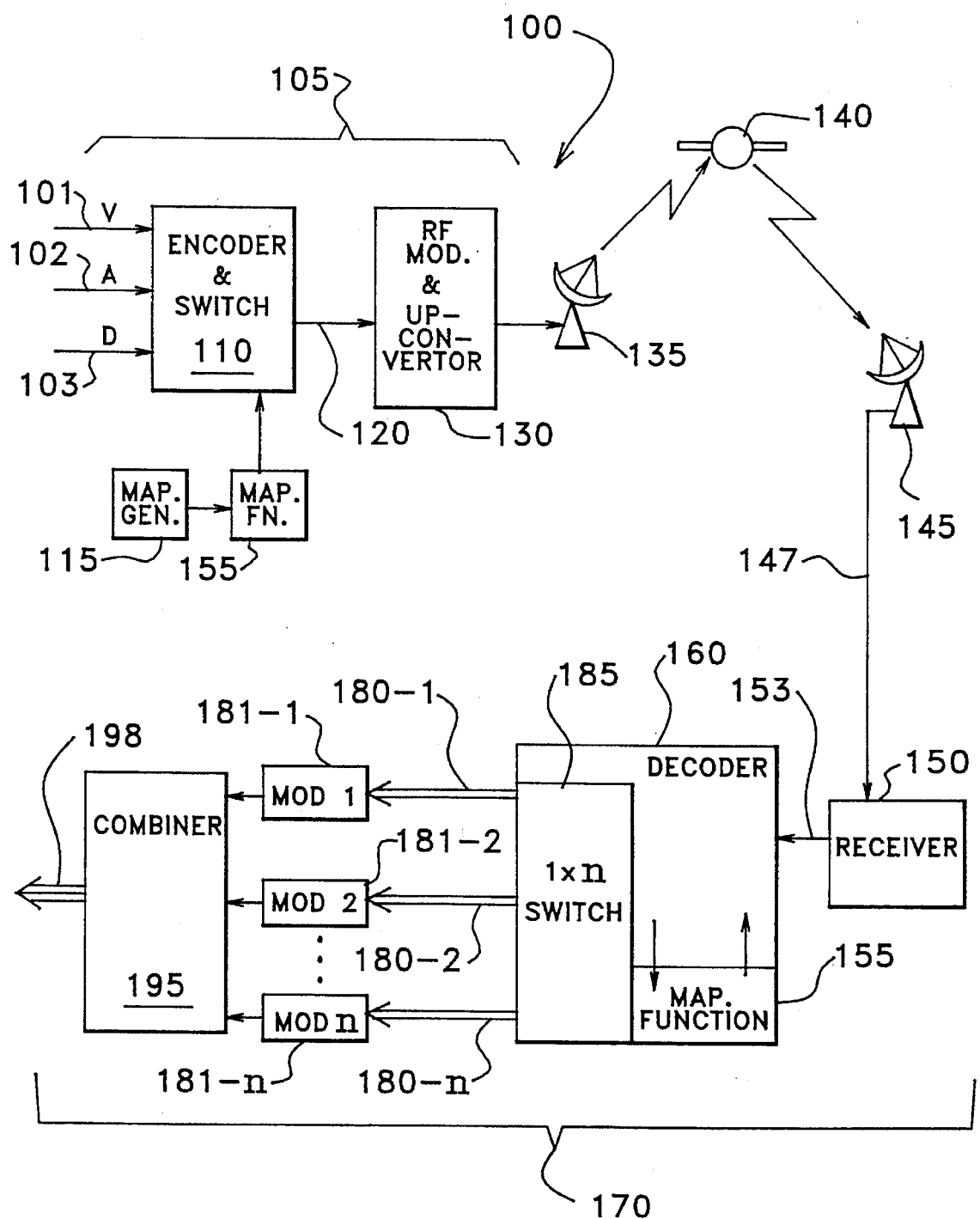
FIG. 1 illustrates, in block diagram form, the relationship between the components of an analog version of the present system.

FIG. 1 illustrates an analog embodiment of the present system. It does this by illustrating single channel to multiple channel mapping using a typical 36 MHz satellite television channel. As shown in FIG. 1, System 100 comprises uplink 105 and headend 170 which communicate via satellite 140. Uplink 105 includes encoder and switch 110, RF modulator and upconvertor 130, and antenna 135. Encoder 110 receives video, audio, and digital (data or text) signals on inputs 101, 102 and 103 respectively. Block 115 generates mapping function 155, which is applied to encoder 110 in order to control the correspondence between the various video, audio and data/text channels. The output from encoder 110 is applied to RF modulator and amplifier 130, which FM modulates the signal and upconverts it to the appropriate satellite transponder frequency. A typical analog video channel with associated audio and data subcarriers generally uses 24 MHz or more bandwidth because of transponder bandwidth allocations. The FM modulated analog signal is transmitted from transmitting antenna 135 to satellite 140 where it is retransmitted to receiving antenna 145 at headend 170. Receiver 150 downconverts the received frequency and supplies decoder 160 with the channels as transmitted from uplink 105. Mapping function 155, which was transmitted as one of the data channels, provides 1×n switch 185 with the information necessary to switch the received video channel onto one or more of the output channels 180-* (note that the character "*" denotes any possible reference number suffixes, for example, 1 to n). Mapping function 155 also provides decoder 160 with the correspondence between output channels 180-* and the audio and data channels. Output channels 180-1 through 180-n are applied to modulators 181-1 through 181-n. The modulated channels are applied to combiner 195 which outputs them on cable 198 to a cable television subscriber's home.

Figure 2:
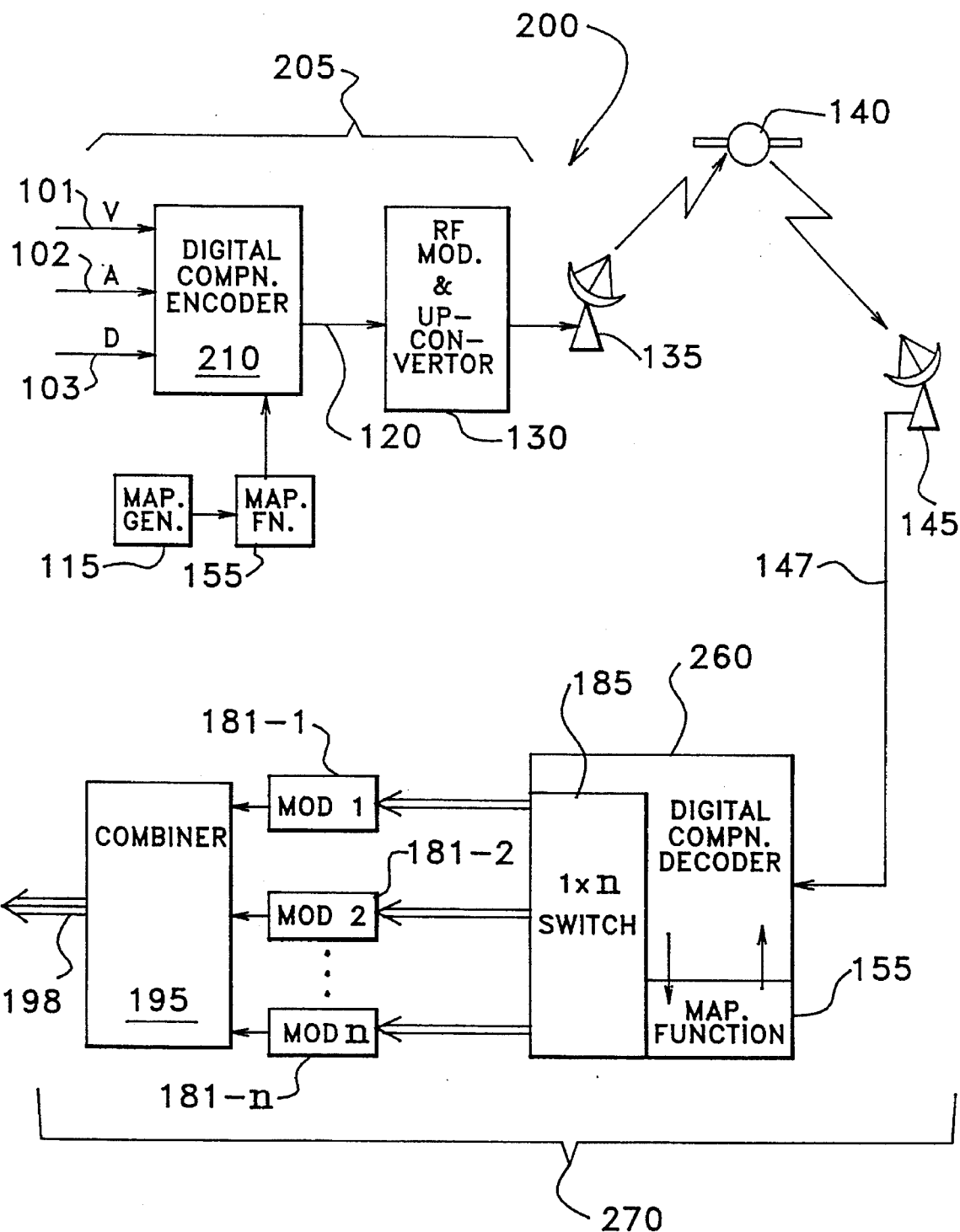
FIG. 2 illustrates a hybrid version of the present system utilizing a compressed digital signal to the headend and an analog signal to a cable television subscriber's home.

FIG. 2 is a diagram of present system 200 which applies a compressed digital signal to the headend and an analog signal to a cable television subscriber's home. System 200 comprises uplink 205 and headend 270 interconnected by transmitting antenna 135, satellite 140 and receiving antenna 145. System 200 is analogous in most respects to system 100 shown in FIG. 1, with the exception that video, audio and data signals 101, 102, and 103, respectively, are digitized and compressed by encoder 210 prior to being transmitted. In addition, at headend 270, the received digital signal is decompressed and converted to a number of analog channels as originally input to uplink 205. These analog channels are modulated, combined, and sent over cable 198 as in FIG. 1.

Because of the digital compression employed, six video channels can be transmitted in a typical transponder bandwidth of 36 MHz at an information rate of 27 Mbps. The modulation used is typically QPSK or offset-QPSK. Digital compression encoder 210 provides digitization of the video analog signals as well as compression thereof. Encoder 210 could be, for example, a General Instruments DSR 2010 or 4010 "Digicipher" encoder. Digital compression decoder 260 provides the inverse functions of decompressing the digitized signal and converting it to analog set of channels. Decoder 260 could be, for example, a General Instruments DSR 1500 or 4500. Digital compression/decompression is well known in the art and there are other encoder/decoder systems which are available to provide the required functionality.

Figure 3:
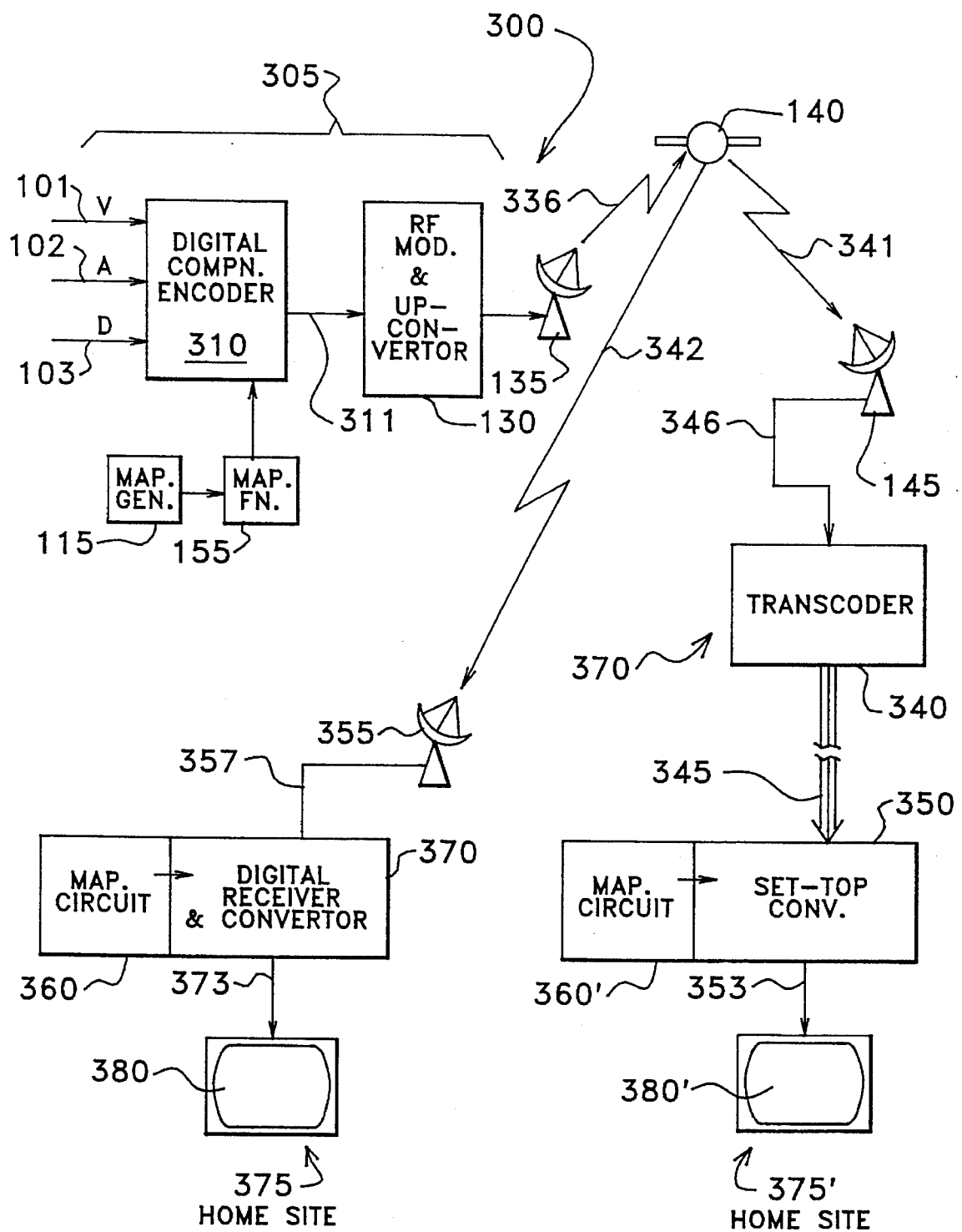
FIG. 3 illustrates two possible embodiments of the present system, wherein the signals transmitted are completely digital between the uplink and the homesite of the cable subscriber.

FIG. 3 is a diagram illustrating two possible embodiments of the present system 300, wherein the signals transmitted are completely digital between the uplink 305 and the homesite 375' of a cable subscriber. A first exemplary embodiment shown in FIG. 3 comprises uplink 305 and headend 370, interconnected by transmitting antenna 135, satellite 140, and the receiving antenna 145. In this embodiment, video, audio, and data signals are digitized and compressed by encoder 310, and transmitted as in FIG. 2. Transcoder 340 at headend 370 transcodes the received signal 341. This means that the received signal is decompressed, processed, and re-compressed. Transcoding allows a cable operator the flexibility of changing/deleting channel numbers and also the ability to add access restrictions, local messaging, programming or advertising, etc. The compressed digital signal is sent over cable or fiber network 345 to a subscriber's home site 375'. At subscriber site 375', set-top convertor 350 decompresses the incoming digital signals and demodulates them to provide the appropriate type of analog television signal, such as NTSC, PAL, or SECAM standards. Mapping circuit 360' establishes the proper correspondence between the video, audio and data signals. Set-top convertor 350 also allows the user to select the channel to be displayed on the television screen 380'.

In a second exemplary embodiment shown in FIG. 3, the signal transmitted from satellite 140 is received by home satellite antenna 355 at subscriber home site 375. In this embodiment, mapping circuit 360 controls digital receiver and convertor 370 so as to display the channel selected by the user on screen 380. The convertor in block 370 provides the same functionality as set-top convertor 350 described above.

ANALOG SYSTEM

Figure 4:
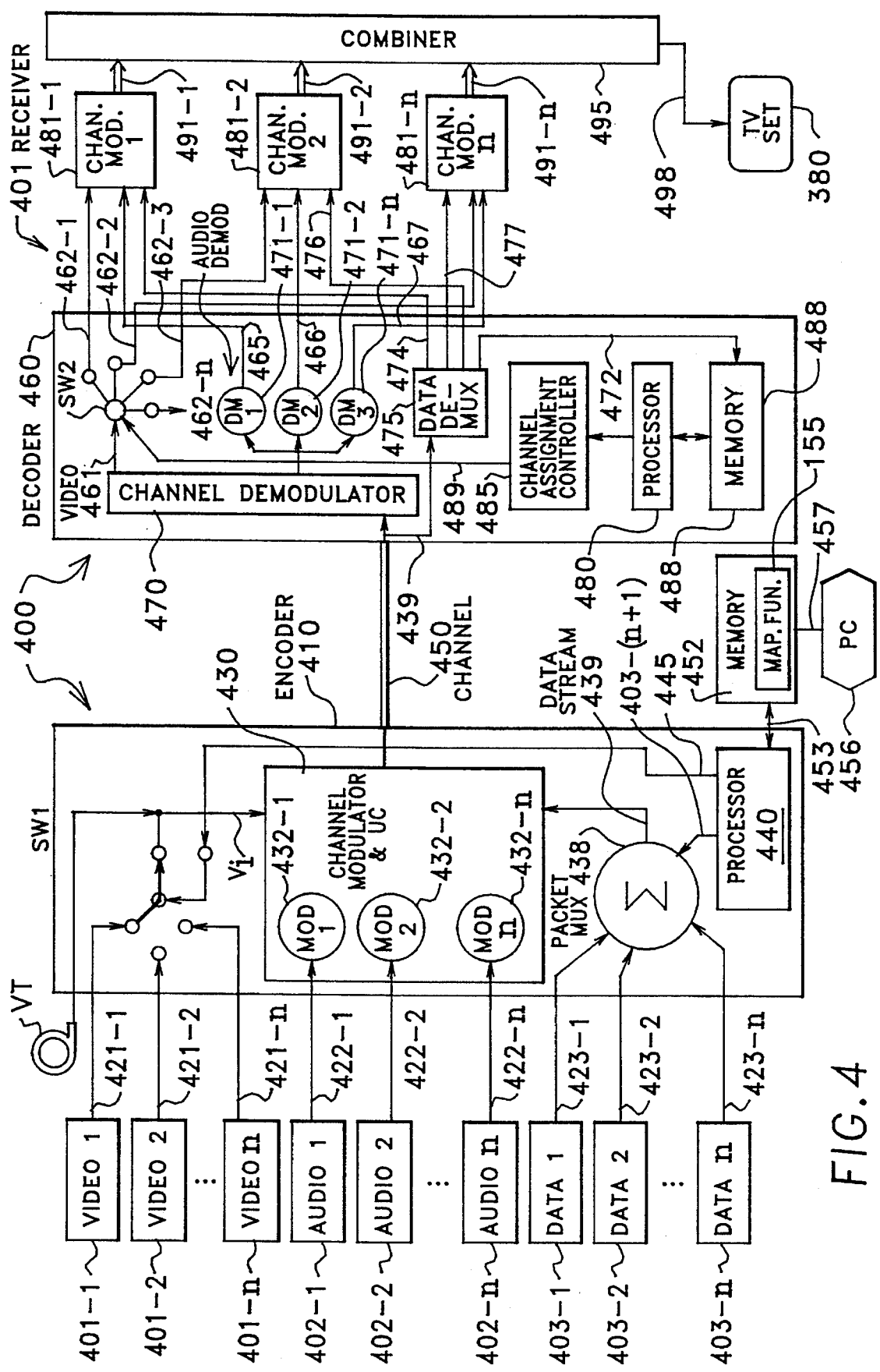
FIG. 4 illustrates, in further detail, the components of an analog version of the system of FIG. 1.

FIG. 4 illustrates further details of the system of FIG. 1 including the relationship between the components of an analog version of the present system 400 for real time television channel expansion. System 400 comprises encoder/switch 410 connected via channel 450 to decoder 460. Encoder/switch 410 is, for example, a General Instruments VideoCipher (VCRS) encoder. Channel 450 is a typical television transmission channel having a bandwidth of 6 MHz.

Encoder/switch 410 has a plurality of signal inputs including video inputs 401-1 to 401-n, audio inputs 402-1 to 402-n, and digital data inputs 403-1 to 403-n. Since a television channel has a fixed bandwidth, only a single video signal can be transmitted over the channel, 450 irrespective of the number of accompanying audio/data signals. Therefore, it must be decided which one of the video inputs 401-*, hereinafter termed the "Active Video Channel" Vi, is to be output from encoder/switch 410 to on channel 450. An "Active Channel Select" command is output from PC (typically, a personal computer) 456 to memory 452. PC 456 can be any type of microprocessor or firmware circuit which is capable of outputting over path 457 a 1 to 2 byte channel select command to mapping function 155, the length of which is appropriate to the desired mapping capability, for example, 16 bytes.

Processor 440 reads over path 453 and interprets the Active Channel Select command 457 to provide an applied 445 which is output on path to video switch SW1. This output on path 445 determines which one of the video inputs 401-* is to be applied as signal Vi to channel 450 from encoder/switch 110. Mapping function 155 is input to memory 452 via path 457 by block 456, which is typically a personal computer, or other user programmable device. Switch SW1 is, for example, a Videotek RS103 PC controllable switch. Alternatively, mapping function 155 may be inserted in a portion of the Active Video Channel, such as the vertical blanking interval ("VBI"). This particular method could be employed to conserve channel bandwidth when it is known that the VBI in a particular video channel is not being used for closed captions, etc.

The Active Channel Select command 457 is subdivided into two segments—an input segment which determines which video input (i.e., the Active Video Channel Vi) is to be applied to encoder/switch 410; and an output segment which determines the channel number(s) on which the Active Video Channel Vi will appear at the receiving television set. In all embodiments of the present system, the Active Channel Select command can be considered to be a subset of the mapping function 155.

Alternatively, video input Vi can be selected without using switch SW1 by inputting only a single video signal, for example, on input 421-1. In this situation, a video tape VT has the desired program material, or pre-selected video "channels", pre-recorded thereon, thus obviating the need for video switch SW1.

Mapping function 155, including the output segment of the Active Channel Select Command, is input to processor 440 on path 453 to determine the correspondence between the various audio signals 402-*, data inputs 403-*, and the channel number of the channel 450 (i.e., the channel frequency) on which these combined signals are to be output from encoder/switch 110. Mapping function 155 (containing the Active Channel Select command) is applied to the digital data stream containing data inputs 403* by processor 440 over path 403-(n+1). In an alternative embodiment, PC 456 is programmed to directly control switch SW1 and packetizer/multiplexer 438 (described below), in which case processor 440 is not needed.

The audio and data inputs 402-* and 403-* are modulated and upconverted (translated) by modulator/upconvertor 430 to the appropriate channel frequency as determined by the present selected Active Channel number and mapping function. Although only a single "active video" channel can be transmitted over a given television channel, the present system provides the option of including additional selectable audio and/or data signals on the same channel as the active video signal. As indicated above, mapping function 155 provides a means for associating selected combinations of audio/data signals 402-*/403-* with the Active Video Channel Vi.

For example, in a television system with stereo sound and dual language capability there could be four audio signals available. In the present system, all of these audio signals 402-* are available at the input to encoder/switch 410.

Data inputs 403-1 to 403-n are input to packetizer/multiplexer 438 where they are packetized with encoded information identifying the audio input 402-* to which the data input 403-* corresponds. Packetizer/multiplexer 438 combines the packetized audio data into a data stream 439 which is input to channel modulator/upconvertor 430. Audio channels 402-1 to 402-n are separately modulated by corresponding modulators 432-1 to 432-n. Channel modulator/upconvertor 430 is thus presented with a single active video picture 401-*, a plurality of audio inputs 402-*, and a data stream 439 comprising multiplexed data inputs 403-*, along with a mapping function 155 which includes an Active Channel Select command (channel number) identifying the Active Video Channel Vi. These inputs are then modulated onto a single conventional television channel 450 which is transmitted via satellite or cable in a conventional fashion.

When the modulated signal transmitted over channel 450 is received by receiver 401, decoder 460 performs several functions which are described as follows. Data stream 439 received on channel 450 is de-multiplexed by circuit 475, and the resulting individual data streams 474 to 477 are routed to the appropriate channel modulators 481-*. Mapping function 155 is applied via path 472 to memory 488. Processor 480 controls channel assignment controller 485 in accordance with mapping function 155 to determine the correspondence between Active Video Channel Vi input on channel 450 and video outputs 462-* by sending appropriate switching information to video switch SW2. Channel demodulator 470 demodulates Active Video Channel (AVC) Vi on path 461, and applies the demodulated AVC to 1×n video switch SW2, which then applies the AVC to the appropriate channel modulator(s), e.g., channel modulators 481-1 to 481-n, as determined by switch SW2. These channel modulators 481-* are, for example, Jerrold Commander 6 model 6CM modulators. Undemodulated audio signals are passed through demodulator 470 to audio demodulators 471-1 to 471-n, where they are demodulated and sent to the appropriate channel modulators **481-*. Decoder 460** is, for example, a General Instrument Video-Cipher (VCRS) decoder.

The Active Channel Select segment of mapping function 155 determines which receiving television channel number carries the combined demodulated video and the selected audio signals and data streams to produce a specific "hybrid" television channel. Each of these hybrid television channels is then applied as input to a channel modulator 481-* which modulates the particular hybrid channel to generate a plurality of television screens on outputs 491-1 to 491-n. Outputs 491-1 to 491-n are then input to combiner 495 which presents the combined modulated channels as individual screens selectable for viewing on TV set 380. Combiner 495 is, for example, a Jerrold HC-12X combiner.

DIGITAL SYSTEM

Figure 5:
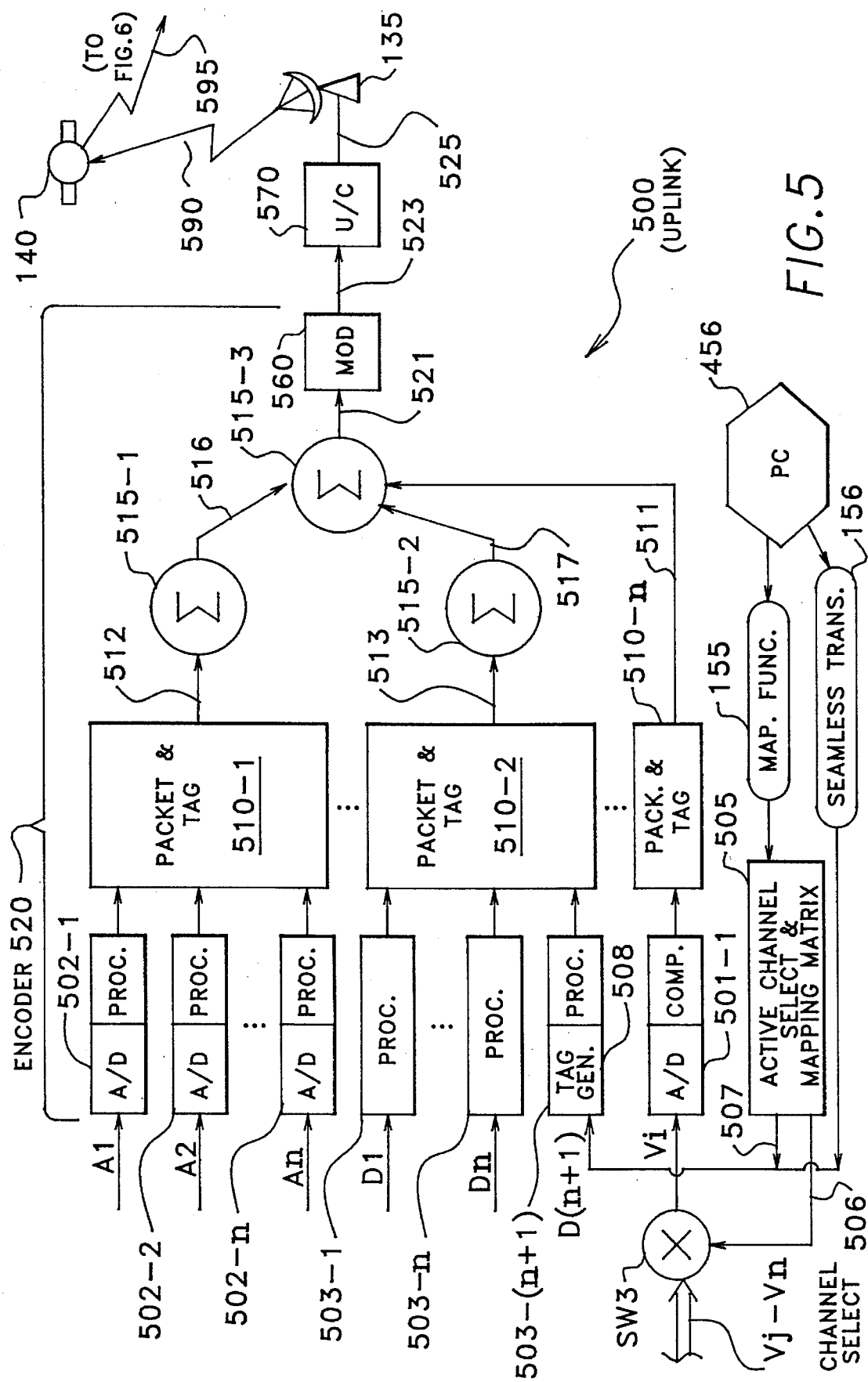
FIGS. 5 and 6 illustrate, in further detail, a totally digital version of the present system.
Figure 6:
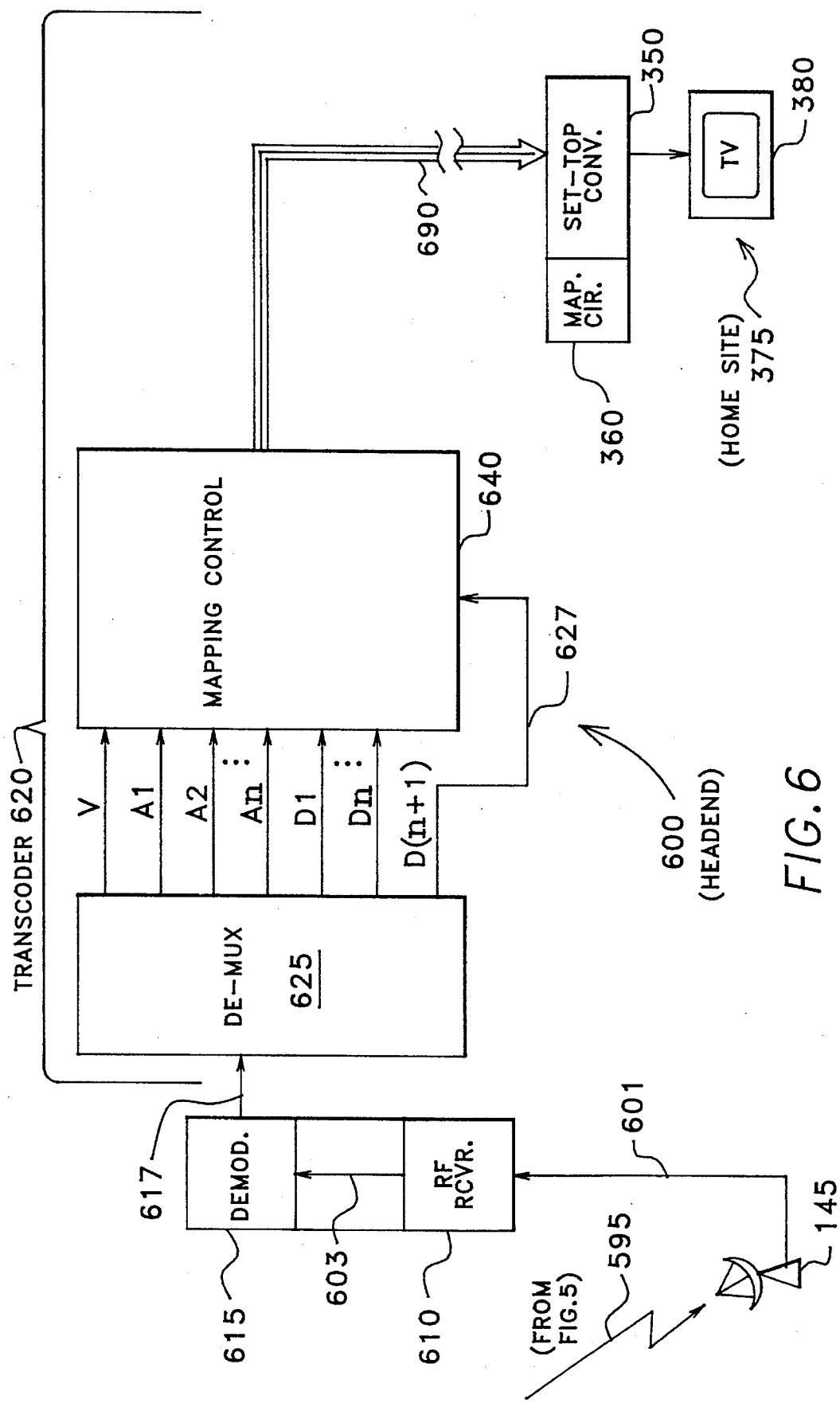

FIGS. 5 and 6 illustrate, in greater detail, a totally digital embodiment of the present system. More specifically, FIG. 5 illustrates the uplink portion 500 of the digital system of the present invention. While the mapping principle is the same as that used by the analog system, the use of a digital compression method such as MPEG 2 or DigiCipher 2 results in significantly higher performance and a greater degree of flexibility than is possible with an analog system. In a digital embodiment, the Active Video Channel is selected as in the analog system. However, each ADC (audio and data channel) is treated as a separate channel and compressed as a separate channel for transmission. This scheme provides the advantage that, in data channels where there are long periods of time (e.g., seconds) wherein the text and graphics do not change, digital compression allows the bit rate to be much lower than if the static screen were constantly transmitted. This lower bit rate is due to the fact that adaptive coding schemes recognize that no motion is present, and thus reduces the effective bit rate of the particular channel. The audio signal is compressed as it is normally compressed with a choice of bit rate dependent on the fidelity desired in the respective compression method.

As a result of using digital compression, the number of additional bits per second required to transmit, for example, five additional channels is less than 500 Kbps. In a compressed digital system wherein a typical channel uses 10 Mbps, the bandwidth occupied by these additional channels represent less than 5% of the total channel bandwidth. In a digital embodiment of the present system, it is not perceivable to the viewer that six different screens are effectively occupying the same channel space.

Furthermore, when the active video medium is a motion picture "film", it is possible to achieve higher rates of compression, so that additional data channels do not usurp any needed bandwidth at all. Higher data compression rates in "film mode" are due to the greater framing redundancy present in films as compared to video-taped program material.

In an alternative embodiment of the present system, as shown in greater detail in FIG. 10 (described below), the cable subscriber's decoder contains a resident multiple language font set in ROM 1050 (i.e., a "special character set"). This allows all text to be sent in the recipient's language using a character set such as ASCII or an appropriate 8 or 16 bit code instead of graphics. The use of a resident character set significantly reduces the required bit transmission rate, due to the additional bandwidth overhead inherent in transmitting predefined (e.g., ASCII) characters in graphical form. As shown in FIG. 5, encoder 520 receives audio inputs A1 to An, data inputs D1 to D(n+1), and video input $V_i$. Audio inputs A1 to An are processed by circuits 502-1 to 502-n, each of which comprise an A/D converter and digital processing circuitry. Likewise, the video signal Vi is processed by circuit 501-1 which digitizes and compresses the video signal. Data input signals D1 to D(n+1) are processed by circuits 503-1 to 503-(n+1)(507). After being digitally processed/compressed into data streams, the audio, data (text/graphics) and video inputs are applied to the appropriate packetization and tagging circuits 510-1, 510-2, and 510-3. Circuits 510-1 to 510-n segment the processed bit streams into appropriate packets and place appropriate linking or "tagging" information in a header at the beginning of each packet. This tagging information provides the correspondence between a given data stream and a channel number, and is used at the home receiving site to route and combine the various audio and text (data) signals with each other and optionally with the active video channel. The packetized and tagged audio is combined into bitstream 516 by multiplexer 515-1. The packetized and tagged digital data is combined into bitstream 517 by multiplexer 515-2. Since encoder 520 only receives a single video signal, no multiplexing is needed for this signal. The packetized and tagged audio, data, and video signals are input to multiplexer 515-3, which applies the tagged bitstream to modulator 560. This modulated bitstream is then upconverted by upconverter 570 and transmitted to satellite 140 by transmitting antenna 135. In this embodiment, encoder 520 is, for example, a General Instruments DigiCipher II or other MPEG II compatible encoder, including modulator 560 and forward error correction capability. Block 570 is typically a C/KU band upconverter, for example, a Miteq or LNR upconvertor for the appropriate frequency band.

PC 456 generates mapping function 155 which includes Active Channel Select & Mapping Matrix 505. PC 456 also generates seamless transition function 156, which is explained in further detail below. PC 456 can be any type of microprocessor or firmware circuit which is capable of outputting a mapping function 155 which is 16 or more bytes in length, including a 1 to 2 byte channel select command. Matrix 505 includes input D(n+1) which is used to determine the correspondence between the audio, data, and video channels, as described in greater detail below. Matrix 505 includes Active Channel Select command which is applied to switch SW3. Switch SW3 uses the Active Channel Select command to determine which of the video inputs Vj–Vn is to be input as Vi to encoder 520. Alternatively, video input Vi can be selected without using switch SW1 by inputting only a single video signal on input Vi. As described above with respect to the analog version of the system, a pre-recorded video tape containing the desired program material or "channels" could be employed to replace switch SW3.

It should be noted that, in accordance with the present invention, there is only one active video signal input Vi per encoder 520. The remaining encoder inputs comprise a plurality of audio and data signals **502-*/503-*. At output 521 of encoder 520**, one or more screens may display the active video signal. All other screens comprise only text/graphics and/or audio output.

FIG. 6 is a diagram illustrating further details of one possible headend 600 of an all-digital version of the present system. As shown in FIG. 6, headend 600 comprises receiving antenna 145, receiver/demodulator 610/615, and transcoder 620. Signal 595 received from satellite 140

(shown in FIG. 5) is applied to RF receiver 610, which downconverts the signal to the appropriate frequency. The downconverted signal is applied over path 603 to demodulator 615. The demodulated signal (which is a data bitstream) is then applied to demultiplexer 625. Video bitstream V, audio bitstreams A1 to An, and data bitstreams D1 to Dn are applied to mapping control block 640. Data signal D(n+1), which comprises active channel select and channel mapping information (in mapping function 155) is applied to mapping control block 640. Mapping control block 640 is a part of transcoder 620, which is, for example, a General Instruments DigiCipher II model DSR 4500 transcoder. Mapping control block 640 converts the received video, audio, and data streams into virtual channel mapped video/audio/data bitstreams with appropriate security encoding/scrambling for the particular cable system.

The transcoded bitstreams are applied to a coaxial cable or fiber optic cable 690, and then transmitted to set-top convertor 350 at home subscriber site 375. Set-top convertor 350 is, for example, a Hewlett-Packard model CT300 convertor which contains circuitry 360 for mapping the received signals to the appropriate screens as selected by a viewer of TV set 380.

In an alternative embodiment, the system as illustrated in FIGS. 5 and 6 utilizes encoder/decoder circuitry which permits a tagging function:

$$Vi>Vo(o=1,2,\ldots n)$$

to be performed by the encoder, thus allowing a 1×n correspondence between a single video input channel Vi and a plurality of output channels Vo. In this embodiment, instead of transmitting mapping function 155, encoder 520 generates a packet containing 1×n (Vi–Vo) tagging information from tag generator 508, utilizing information contained in the mapping matrix sent over path 507. In this embodiment, mapping function 155 need not be transmitted/decoded, as all bitstreams are automatically routed to the appropriate channels.

MAPPING FUNCTION

Figure 7:
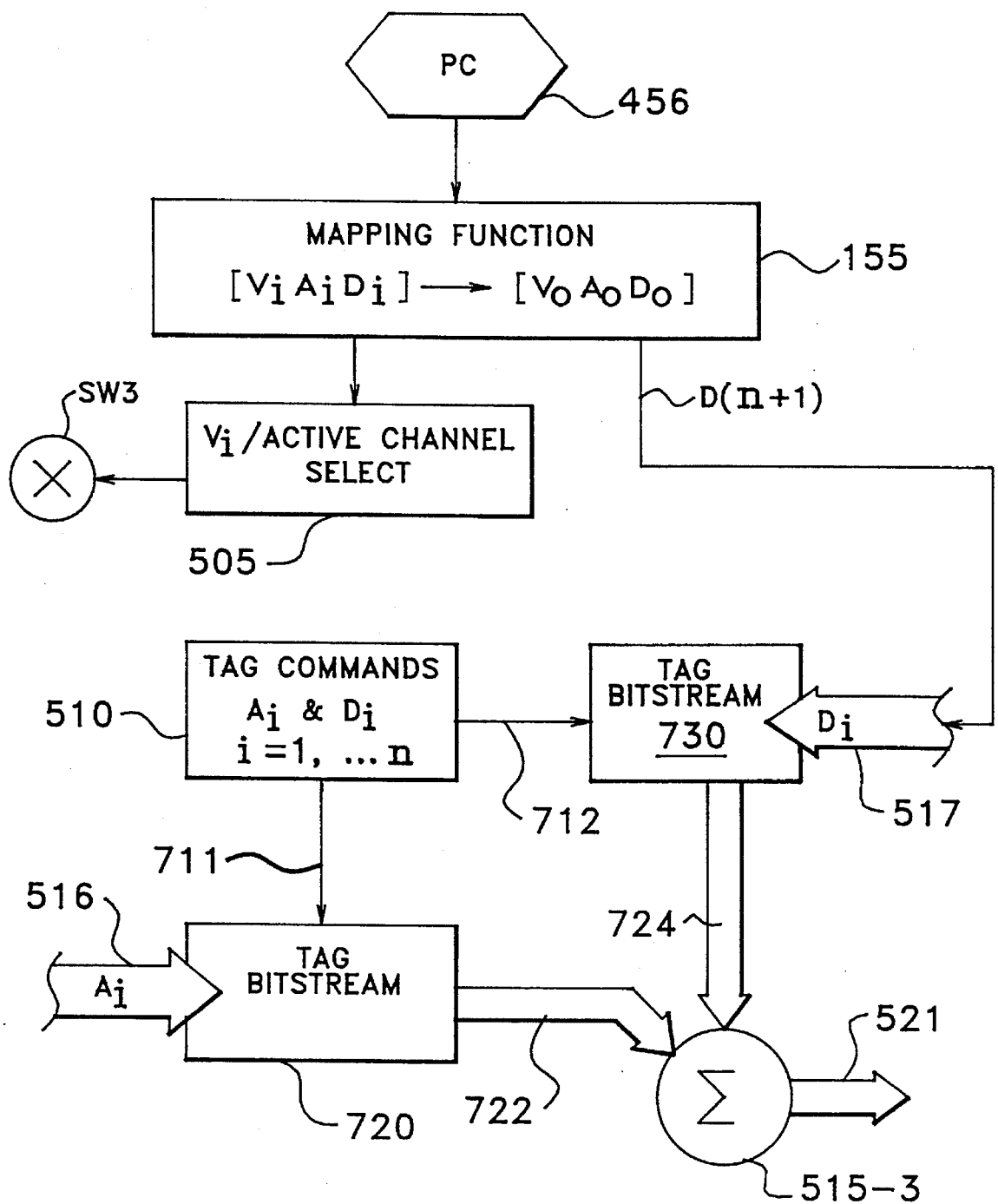
FIG. 7 is a diagram illustrating the principle of the mapping function of the present invention.

FIG. 7 is a diagram illustrating the principle of the mapping function of the present invention. Computer 456 (typically a PC) generates mapping function 155 which is applied to the appropriate encoder. For example, as shown in FIG. 5, PC 456 generates mapping function 155 which is applied to active channel select and mapping matrix circuit 505, which in turn is applied to digital compression circuit 503-(n+1) in encoder 520. As shown in FIG. 7, mapping function 155 comprises a matrix of inputs Vi/Ai/Di, and corresponding outputs Vo/Ao/Do, wherein there is a 1:n correspondence between active video input Vi and active video output Vo, and where n equals the number of screens which may display channel Vi. The output map matrix of mapping function 155 provides an n:1 correspondence between the active video channel Vo and a single audio channel Ai and a single data channel Di.

Mapping function 155 includes the selected active input channel Vi, which is applied, for example, from block 505 (in FIG. 5) over path 506 to switch SW3. This active channel select subfunction determines which single input video channel is to be associated with a combination of audio and digital signals determined by the mapping function matrix.

As shown in FIG. 7, tag commands are generated by, for example, block 510-* in encoder 520 as shown in FIG. 5. Tag commands are applied to audio bitstream 516 and data bitstream 517 at blocks 720 and 730, respectively. Resultant audio and data bitstreams 722 and 724 are then combined by multiplexer 515-3 to form a composite or tagged bitstream 521. Note that in FIG. 7, blocks 720 and 730 are equivalent to the combination of blocks 502-*+503-*; 510(-1,-2); and 515(-1,-2), as shown in FIG. 5.

MAPPING FUNCTION EXAMPLE

Figure 8:
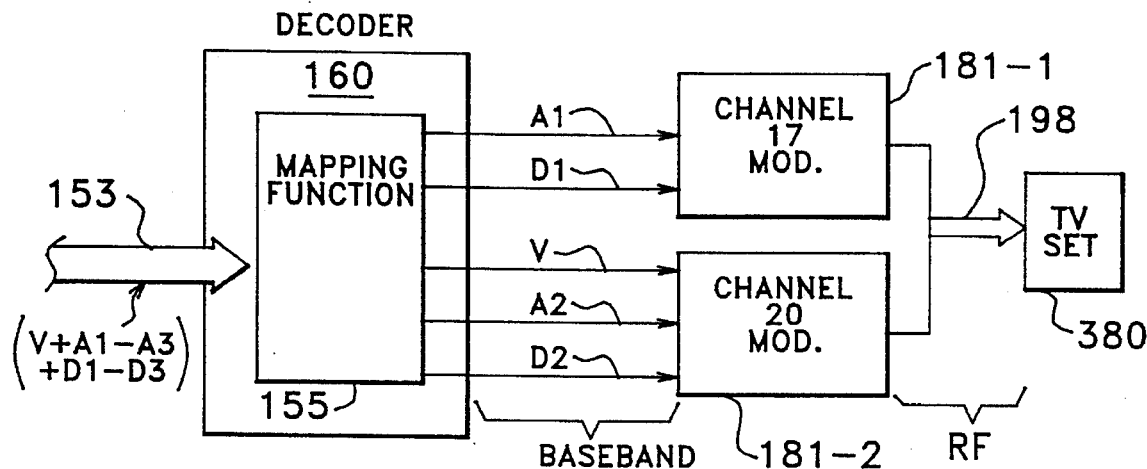
FIGS. 8 and 9 depict two possible channel configurations using the present mapping function principle.
Figure 8:
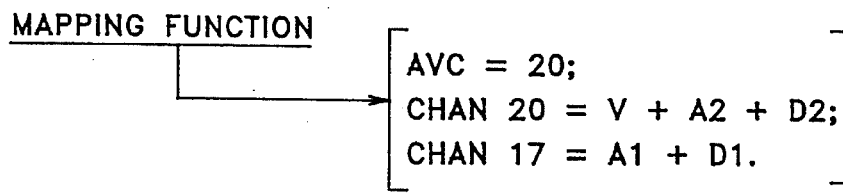
Figure 9:
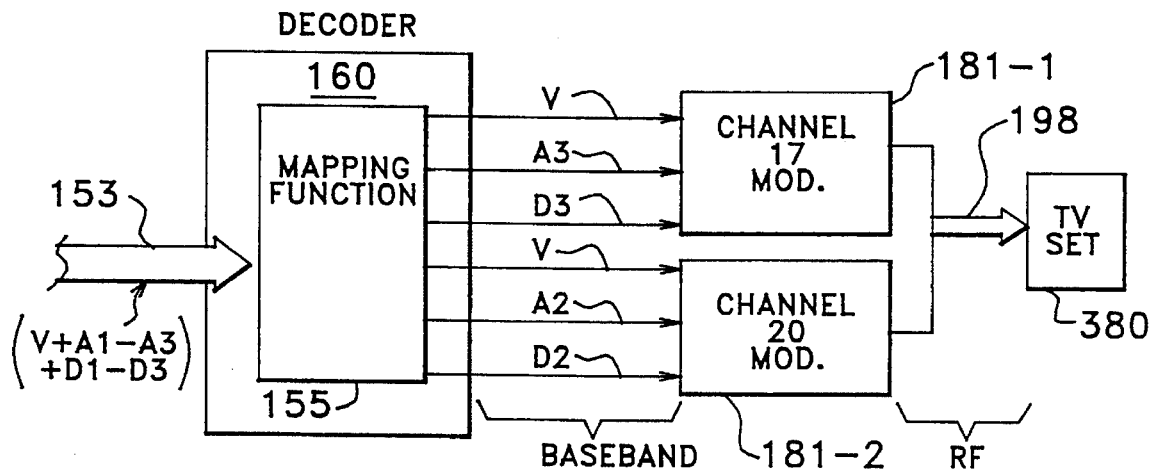
Figure 9:
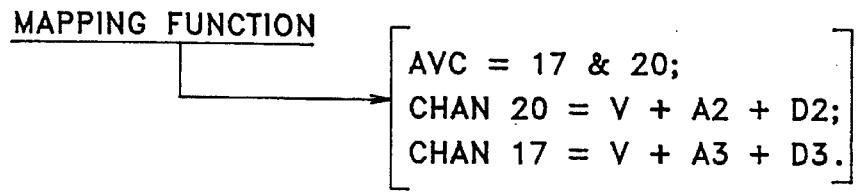

FIGS. 8 and 9 depict two possible channel configurations using the mapping function principle of the present system. As shown in FIG. 8, decoder 160 receives active video signal V, audio signals A1 to A3, and digital signals D1 to D3 on channel 153. In FIG. 8, the mapping function (received in the data stream transmitted over channel 153) designates channel 20 as the Active Video Channel (AVC). The mapping function further designates the correspondence between the audio inputs A1 to A3 and data inputs and D1 to D3 and the output channels 181-*. As also shown in FIG. 8, the mapping function indicates that channel 20, in addition to receiving the Active Video Channel, also incorporates audio signal A2 and digital signal D2. This particular mapping function also indicates that channel 17 consists of audio signal A1 and digital data signal D1.

In accordance with the mapping function as shown in FIG. 8, it can be seen that signals A1 and D1 are applied to channel 17 modulator 181-1, and signals V, A2, and D2 are applied to channel 20 modulator 181-2. Either of these channels can be selected for viewing on television set 380.

The channel configuration shown in FIG. 8 could represent, for example, the situation in which a viewer was watching a program on either channel 17 or channel 20. Audio signal A1 and digital data signal D1 on channel 17 could comprise a combination of graphics, messages, etc. with voice or music in the background. A typical combination of audio and data would provide for applications such as language education, stock market quotes, or home shopping, where the goods to be sold are shown in still pictures which are transmitted in the data stream. Concurrent with the transmission of channel 17, channel 20 would also be available for viewing. As shown in FIG. 8, channel 20 is provided with the Active Video Channel, in addition to audio signal A2 and digital signal D2. This combination of signals allows a movie to be viewed with the audio from signal A2 and subtitles transmitted via the D2 data stream, for example.

FIG. 9 shows a possible alternative channel configuration wherein the inputs to encoder 160 are the same as in FIG. 8, but where the mapping function has been modified (at the transmitting end of channel 153). As shown in FIG. 9, The mapping function designates that Active Video Channel V is to be output on received channels 17 and 20; channel 20 also receives audio signal A2 and data signal D2; and channel 17 also receives audio signal A3 and data signal D3. Channels 17 and 20 are modulated by modulators 181-1 and 181-2, respectively, and are selectable for viewing on television set 380.

As shown in FIG. 9, if animation or other moving picture video is required in channel 17, then the mapping function is changed to cause the Active Video Channel to be output to channel 17. The mapping function in this example causes the Active Video Channel to be output to both channels 17 and 20. In such a situation, the same movie could be shown on both channels, and different audio signals (A3 and A1) as well as different data streams (D3 and D1) would be output to channels 17 and 20, respectively. Signals A1/A3 and D1/D3 could be dubbing and subtitling in different languages, for example.

CHANNEL MAPPING AT HOME SITE

Figure 10:
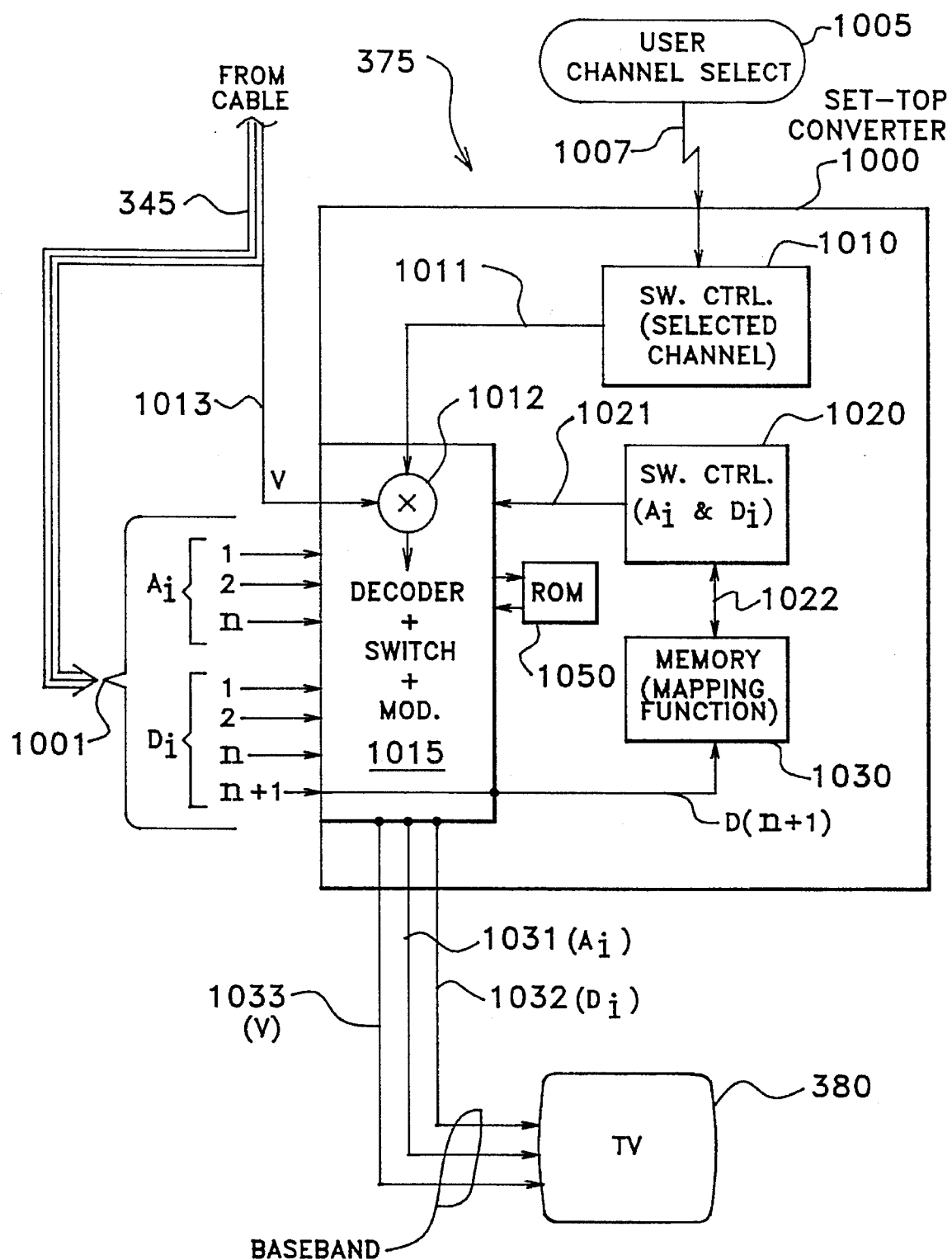
FIG. 10 is a diagram illustrating an embodiment in which channel mapping takes place at a cable subscriber's home site.

FIG. 10 is a diagram illustrating one embodiment in which channel mapping takes place at a cable subscriber's home site 375. As shown in FIG. 10, set-top convertor 1000 receives a television signal over cable 345, as shown in FIG. 3. This signal as shown on cable 345 could also be supplied by a home satellite receiver on path 357 as also shown in FIG. 3. Set-top convertor 1000 is typically remotely controlled by user channel select remote control device 1005. When a user selects a given channel via remote device 1005, switch controller 1010 outputs the selected video channel number to switch 1012, which receives the Active Video Signal V on path 1013. Switch 1012 then outputs the selected video channel to decoder/switch/modulator 1015. The remaining audio and data (text/graphics) channels are input to block 1015 as shown by bracket 1001, which includes audio channels Ai (i=1 to n) and data channels Di (i=1 to n+1). Data channel D(n+1) transmits mapping function 155 to memory 1030. Switch controller 1020 accesses mapping function memory 1030 and provides an input on path 1021 to block 1015 to determine which audio output Ai and data Di corresponds to the user-selected channel. The appropriate outputs are then modulated and sent as baseband signals over paths 1031 to 1033 to television set 380. The functionality described above with respect to FIG. 10 is provided by, for example, a Hewlett-Packard model CX300 or a General Instruments model "Ovation 10" set-top convertor.

In an alternative embodiment of the present system, the cable subscriber's set-top convertor 1000 contains a resident special character set in ROM 1050. This allows all text to be sent in the recipient's language using a character set such as ASCII or an appropriate 8 or 16 bit code instead of graphics. The use of a resident character set significantly reduces the required transmission bit rate.

DIGITAL SYSTEM WITH INTEGRATED RECEIVER/DECODER

Figure 11:
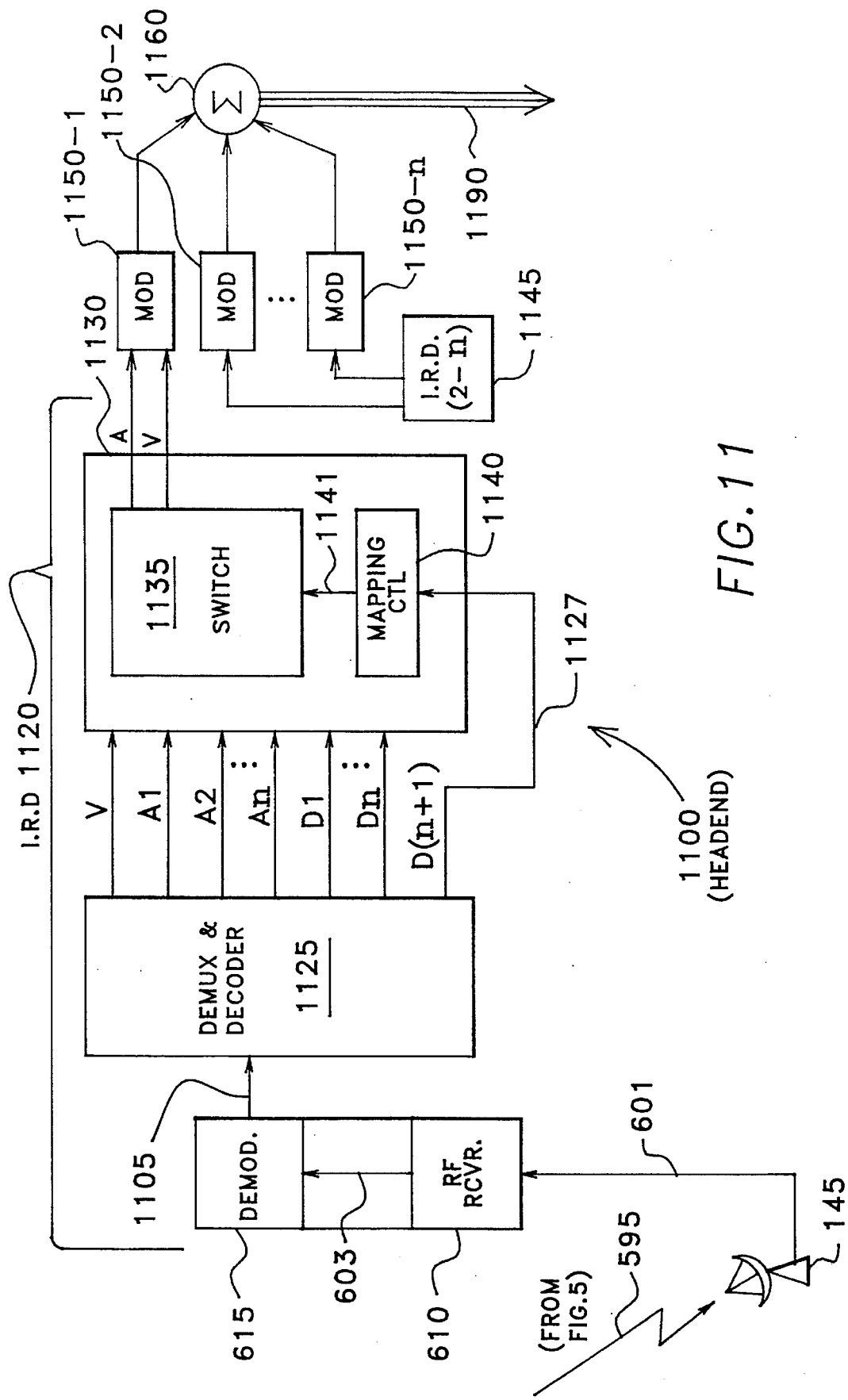
FIG. 11 illustrates an embodiment of a digital version of the system which employs an integrated receiver/decoder.

FIG. 11 illustrates a headend 1100 of a digital version of the system which employs an integrated receiver/decoder 1120. The system shown in FIG. 11 employs the same encoding and transmitting circuitry as described with respect to FIG. 5, above. RF receiver/demodulator 610/615 is the same circuitry as described with respect to FIG. 6. The demodulated composite bit stream containing audio, video, and data is input via path 1105 to de-multiplexer and decoder 1125 which are part of Integrated Receiver/Decoder (IRD) 1120, which is, for example, a General Instruments model DSR 4500. IRD 1120 decompresses the video signal, decrypts the audio and data streams, and uses the received tagging information as well as data stream D(n+1) to map the active video, audio, and data (text/graphics) streams to the appropriate channels via switch 1135. The output from IRD 1120 comprises the analog audio and video signals A and V of a given channel, with any data such as text or graphics having been merged into the video signal. One such decoder is required for each channel in a cable television system.

The audio and video output of each decoder is input to a single demodulator 1150-1 whose output is a 6 MHz composite video signal for the particular channel. A plurality of such channels may be output by other IRDs 1145-2 to 1145-n and applied to modulators 1150-2 to 1150-n, respectively. Combiner 1160 then combines these channels and sends them to cable subscribers over cable 1190.

In another alternative embodiment, receiving antenna 145 is a home satellite antenna, and the IRD circuitry shown in FIG. 11 is provided by a receiver/set-top convertor as described with respect to FIGS. 6 and 10. In this embodiment, combiner 1160 is not required, and the desired channel is tuned by the viewer, so that only a single modulator 1150-1 is employed to provide the selected channel.

OTHER SYSTEM FEATURES

Seamless Transition: Although "seamless transition" from a screen containing an active video channel (AVC) to a screen having only audio and/or data (ADC) is "automatically" implemented by a typical digital system, an analog system must provide the means for accomplishing such a transition. The present system provides for a transition between ADCs and AVCs in a fashion that presents no sudden change in a viewed television screen which would be annoying to the viewer. This is done via software resident in PC 456 of FIG. 4, for example, that causes the active video to be superimposed on a chosen area of the passive video screen, and then zooms the active video until the moving picture occupies the entire screen.

In an analog system, when a screen transition is made between an ADC and an AVC, the active video picture is mapped into a fraction (e.g., 10%) of the screen. The rest of the screen displays the text/graphics that existed prior to the transition. This is accomplished by using the same well-known "screen-on-screen" function employed by a television set wherein a second picture is scanned into the existing active picture by skipping lines per the "scan ratio", i.e., the present active picture height vs. the picture tube height. The "zoom" function is accomplished by continuously changing this fraction from 0.1 (for example) to 1.0 over a period of time, e.g., two seconds. The scan ratio is dynamically controlled by PC 456 in a digital system at the transmitting site 500.

The present invention also allows the use of special effects such as "text on picture" and "graphics on picture", which effects can be controlled by software resident in, for example, PC 456.

It is to be expressly understood that the claimed invention is not to be limited to the description of the preferred embodiment but encompasses other modifications and alterations within the scope and spirit of the inventive concept.

We claim:

1. A method for enabling the viewing of one of a plurality of different screens on a TV set by transmitting a plurality of virtual television channels from a transmitting site to a viewing site within a bandwidth substantially equal to that of a single video channel, said method comprising the steps of:

(a) operating combining means for receiving a single selected active video signal from a source having a plurality of available video signals, (b) operating said combining means for receiving a plurality of audio channels and data channels from said source;

(c) operating a controller means external to said combining means to generate a dynamically controllable mapping function to establish correspondence, at said viewing site, between said virtual television channels, and:

(1) said selected active video signal, (2) said audio channels, and (3) said data channels;

(d) transmitting said dynamically controllable mapping function along with said selected active video signal and said plurality of audio channels and data channels as separate and independent signals from said combining means to said viewing site using the bandwidth of only a single video channel; and (e) dynamically combining onto at least one of said virtual television channels selected by said viewer, one of said audio channels and/or one of said data channels and said active video signal, in accordance with said dynamically controllable mapping function so that said selected active video signal is time shared with a plurality of said virtual channels whereby a virtual channel receives one of said data channels and/or one of said audio channels when not receiving said selected active video signal.

2. The method of claim 1, wherein said mapping function is transmitted in one of said data channels independent of said selected active video signal and wherein said data channels contain graphics.

3. The method of claim 1 where said method further includes the steps of:

(a) converting said active video signal, said audio channels, said data channels, and said mapping function to digital data packets;

(b) tagging each of said packets with a channel number tag corresponding to said dynamically controllable mapping function; and (c) transmitting said packets in a digital bit stream to said viewing site;

(d) applying, at said viewing site, said active video signal to at least one television channel in correspondence with said dynamically controllable mapping function.

4. The method of claim 3, wherein said dynamically controllable mapping function is transmitted in one of said data channels.

5. The method of claim 3, wherein, in accordance with said dynamically controllable mapping function, at least one of said television channels does not include said active video signal.

6. The method of claim 1, wherein, in accordance with said dynamically controllable mapping function, at least one of said virtual television channels does not include said selected active video signal and wherein said data channels contain graphics.

7. The method of claim 1 wherein said dynamically controllable mapping function is inserted for transmission into one of said data channels; and wherein said step of switchably combining comprises the step of generating a selected one of said screens on said TV set by switchably combining one of said audio channels and/or one of said data channels and said active video signal, in accordance with said dynamically controllable mapping function.

8. The method of claim 7, wherein, in accordance with said mapping function, at least one of said screens does not include said active video signal.

9. The method of claim 7, wherein said method further includes the steps of:

(a) converting said active video signal, said audio channels, and said data channels to digital data packets;

(b) tagging each of said packets with a channel number tag corresponding to said dynamically controllable mapping function; and (c) transmitting said packets in a digital bit stream to said viewing site.

10. The method of claim 9, wherein, in accordance with said dynamically controllable mapping function, at least one of said screens does not include said active video signal.

11. A system for transmitting a plurality virtual of television channels from a transmitting site to a viewing site using the bandwidth of only a single video channel, said system comprising:

(a) a source of signals;

(b) combining means;

(c) means in said combining means for receiving a selected active video signal from a plurality of video signals of said source, (b) means in said combining means for receiving a plurality of audio channels and data channels from said source;

(c) control means external to said combining means, for providing to said combining means a dynamically controllable mapping function to establish correspondence, at said viewing site, between a virtual television channel selected by a viewer, and:

(1) said selected active video signal, and (2) said audio channels, and (3) said data channels;

(d) means for transmitting said dynamically controllable mapping function as a separate and independent signal along with said active video signal and said plurality of audio channels and data channels to said viewing site from said combining means; and (e) switching means for dynamically combining onto said virtual television channel selected by said viewer, one of said audio channels with one of said data channels and said active video signal, in accordance with said dynamically controllable mapping function so that said active video signal is dynamically shared by said virtual channels whereby a virtual channel receives, an audio channel and/or a data channel when not receiving said selected active video signal.

12. The system of claim 11, wherein said dynamically controllable mapping function is transmitted by said combining means in one of said data channels and wherein said data channel comprises graphics.

13. The system of claim 11, wherein, in accordance with said dynamically controllable mapping function, at least one said television channels does not include said active video signal and wherein said data channel comprises graphics.

* * * * *